(12) United States Patent
Schmidt et al.

(10) Patent No.: US 7,713,469 B2
(45) Date of Patent: May 11, 2010

(54) DEVICE AND METHOD FOR MONITORING THE PRODUCTION OF TABLETS IN A ROTARY PRESS

(75) Inventors: Ingo Schmidt, Schwarzenbek (DE); Werner Seifert, Wentorf (DE)

(73) Assignee: Fette GmbH, Schwarzenbek (DE)

( * ) Notice: Subject to any disclaimer, the term of this patent is extended or adjusted under 35 U.S.C. 154(b) by 600 days.

(21) Appl. No.: 11/623,835

(22) Filed: Jan. 17, 2007

(65) Prior Publication Data
US 2007/0164480 A1 Jul. 19, 2007

(30) Foreign Application Priority Data
Jan. 18, 2006 (DE) .................... 10 2006 002 359

(51) Int. Cl.
*B29C 43/08* (2006.01)
*B29C 43/58* (2006.01)

(52) U.S. Cl. .................. 419/49; 419/68; 425/143; 425/171; 425/345; 700/197; 700/206

(58) Field of Classification Search .......... 419/49, 419/68; 425/143, 170–171, 78, 344–345; 700/197, 206
See application file for complete search history.

(56) References Cited

U.S. PATENT DOCUMENTS

| | | | |
|---|---|---|---|
| 5,504,332 A | 4/1996 | Richmond et al. | 250/339.12 |
| 5,760,399 A | 6/1998 | Trygstad | 250/339.07 |
| 6,122,565 A * | 9/2000 | Wenning et al. | 419/49 |
| 6,861,018 B2 * | 3/2005 | Koyama et al. | 425/143 |
| 7,014,443 B2 * | 3/2006 | Hinzpeter et al. | 425/167 |
| 7,125,234 B2 * | 10/2006 | Scholz et al. | 425/167 |
| 7,168,942 B1 * | 1/2007 | Wieder | 425/143 |
| 2004/0012781 A1 | 1/2004 | Gehrlein et al. | 356/328 |

FOREIGN PATENT DOCUMENTS

| | | |
|---|---|---|
| DE | 30 01 816 C2 | 7/1991 |
| DE | 101 61 572 A1 | 7/2003 |
| DE | 697 18 811 T2 | 7/2003 |
| DE | 10 2004 008 321 B3 | 11/2005 |
| EP | 0 431 269 B2 | 9/1990 |
| EP | 1 405 621 A1 | 6/2002 |

OTHER PUBLICATIONS

Japanese No. 06290799, filed Nov. 25, 1994, from Patent Abstracts of Japan.

* cited by examiner

*Primary Examiner*—Richard Crispino
*Assistant Examiner*—Thu Khanh T Nguyen
(74) *Attorney, Agent, or Firm*—Vidas, Arrett & Steinkraus, P.A.

(57) ABSTRACT

Device for monitoring the production of tablets in a rotary press, with die bores in a circular die plate for the accommodation of a powder to be pressed, upper- and lower stamps, a pressing station for pressing the powder in the die bores by means of the upper and lower stamps, a tablet stripper for stripping off the tablets ejected by the lower stamps from the upper side of the circular die plate and a machine computer, wherein a contactless working temperature measurement device, being in communication with the machine computer, with a measurement plane between the pressing station and the tablet stripper, is arranged in the press room of the rotary press, and the measurement time of the temperature measurement device is such that at least some of the tablets per rotation of the circular die plate can be established in their temperature.

6 Claims, 1 Drawing Sheet

DEVICE AND METHOD FOR MONITORING THE PRODUCTION OF TABLETS IN A ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary presses are commonly known and are used in a versatile manner in the pharmaceutical industry. They have a rotor, which is mostly driven around a vertical axis, and have upper and lower stamps, dies, circular die plates and cam systems as well as at least one pressing station. When the rotor is rotated, the cam system provides for the vertical positioning of the upper and lower stamps on the partial circle. The filling of the dies with powder-shaped pressing material takes place with the aid of suitable filling systems, a stirring blade equipment or a feeder shoe for instance, so that the dies are continuously filled at rotating rotor. Furthermore, there are preliminary and main pressure rolls, with the aid of which the pressing material is pressed into a tablet. The ejection of the tablets from the dies takes place with the aid of the respective lower stamp, which is actuated by an ejection cam. A stripper strips off the tablets from the topside of the circular die plate to a gravity chute or the like, from which the tablets are lead to a filling station.

From U.S. 2004/0012781 A1, the entire contents of which is incorporated herein by reference, it has become known to equip a reservoir for powder or granulate, assigned to a tabletting machine, from which the tablets are pressed, with a spectroscope. With the aid of the latter, homogeneity and/or humidity of the material are measured. From DE 697 18 811 T2, the entire contents of which is incorporated herein by reference, it has become known to perform spectroscopic analysis by laser irradiation of drug samples. The light emitted from the plasma which is formed by the laser irradiation is given up to an optical spectrometer by an optical system. From U.S. Pat. No. 5,504,332, the entire contents of which is incorporated herein by reference, and U.S. Pat. No. 5,760,399, the entire contents of which is incorporated herein by reference, it has become known to examine the homogeneity of a tablet powder mixture. This method is based on the spectroscopy of the irradiated material.

From DE 10 20004 008321 B3, the entire contents of which is incorporated herein by reference, it has become known to acquire chemical and/or mechanical data with the aid of a NIR- or LIF-sensor in the press room, the pressing process being triggered by a machine computer depending on die positions with respect to the sensor, established by a position transmitter. With the aid of this method, the tablets can be examined online for a plurality of quality parameters, the proportional composition of the tablet material as well as for the hardness thereof in particular and so on.

From EP 0 431 269 B2, the entire contents of which is incorporated herein by reference, it has become known to assign pressing force values to stamps of a rotary press with the aid of an angle impulse generator. The measurement of the pressing force makes it possible to maintain quality criterions, because the pressing force is a measure for the breaking tendency, the tablet weight and the tablet hardness, as is known. In the known method, an angle impulse generator is used, which releases a separate revolution impulse upon revolution of the circular die plate. An encoded signal transmitter is adjusted such that the revolution impulse is released when the pressing force of a certain pressing stamp has reached the maximum value. The angle impulse generator creates at least one continuous impulse series per revolution, which is input into a machine computer. The computer transforms the received impulses into further impulse series, the impulses of which have a distance from each other which corresponds to the distance of the pressing stamps, and the latter impulses are co-ordinated with the indicated maximum pressing force values. Thus, the computer can establish pressing force standard deviations in order to give out evaluations to determine the quality of the production for each tablet.

During the pressing process, energy is naturally introduced into the tablet, the same becoming warmer in this. Some materials to be pressed are thermolabile. During production, a maximum temperature must not be exceeded. In order to accomplish this, it is known to equip tablet presses with cooling installations or to cool down the pressing material itself.

The present invention is based on the objective to provide or indicate, respectively, a device and a method for monitoring the production of tablet presses in a rotary press, by which a detection of the maximum temperature of the tablets during pressing is possible.

BRIEF SUMMARY OF THE INVENTION

In the device according to the present invention, a contactless working temperature measurement device, being in communication with a machine computer, is arranged in the press room, which has a measurement plane which is arranged between the pressing station and the tablet stripper. The measuring time of the temperature measurement device is so short that at least some tablets are measured in their temperature per revolution of the rotor or the circular die plate, respectively, every second or third tablet for instance. Possibly, the measuring speed permits to measure the temperature of every individual tablet, even when hundred tablets per second are produced, which is usual. In this case, the measuring time is 0.01 seconds or less, for instance.

The measurement plane of the device according to the present invention is arranged such that it can acquire the temperature radiation emanating from the tablet. This takes place in a point of time at which the lower stamp begins to eject the tablet or has already ejected it to a certain amount, respectively. The measured temperature value is not the maximum value of its warming, because the maximum value occurs during the pressing action, and a certain period of time elapses after the end of the pressing action until the tablet is ejected, in which cooling down takes place. However, it is easily possible to extrapolate the maximum temperature from the measured temperature value with the aid of the production speed and the cooling characteristics of the tablet material. If a tablet has been warmed up too much, it can be taken care by a suitable intervention into the tablet press via the machine computer that all tablets in which a predetermined temperature value is exceeded are singled out, for instance. According to the circumstances, the production has also to be stopped, in order to change the production conditions such that unacceptably high warmings do no more occur.

According to one embodiment of the invention, an infrared measurement device is preferably provided. The same can be in communication with the machine computer via a line or in a wireless manner for the purpose of logging, monitoring or intervention into the operation of the press.

Preferably, a position transmitter is assigned to the rotor or the circular die plate, such one as is used for the pressing force measurement, for instance, in order to correct the pressing force values for the individual tablets if need be. With the aid of the position transmitter, the temperature acquirement position of the tablets can be established or predetermined, respectively. This means that measurement via the temperature measurement device takes place only then when the respective tablet is situated in the temperature acquirement position. Alternatively, the temperature measurement device can continuously measure temperatures, and the machine computer evaluates only that measurement signal which has been generated in the temperature acquirement position.

In an embodiment of the invention, the temperature of the tablets is measured after the upper stamps have left the die, for instance, with the aid of a contactless working temperature sensor with a very fast measuring time of 0.01 second or less, for instance. With the aid of a position transmitter, position signals for the dies are generated for establishing a temperature acquirement position. The data of the thermosensor are set into a relation with the temperature acquirement positions. By means of the known cooling characteristics, the point in time of the temperature measurement and the point in time of pressing, the maximum temperature of the tablets is established. This can be logged in the machine computer, as has been mentioned. When an unacceptable deviation takes place, in the form of a too high maximum temperature, for instance, countermeasures must be initiated, by changing the pressing parameters, the pressing material or the like, for instance. If need be, the production has to be stopped.

According to one embodiment, more than one measurement can also be made per tablet.

With the aid of the method according to the present invention, the individual energy introduced into a tablet can also be established. The energy quantity can be established according to the relation $Q_i = c \times m \times t$, wherein c is the specific heat capacity of the tablet material, m the mass of the tablet and t the maximum measured temperature. Then $Q_i$ is the heat content relating to 0° C. after pressing. With the aid of the measured and calculated data, respectively, the production process can be optimized.

The present invention will be explained in more detail by means of an example of realisation hereinafter.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
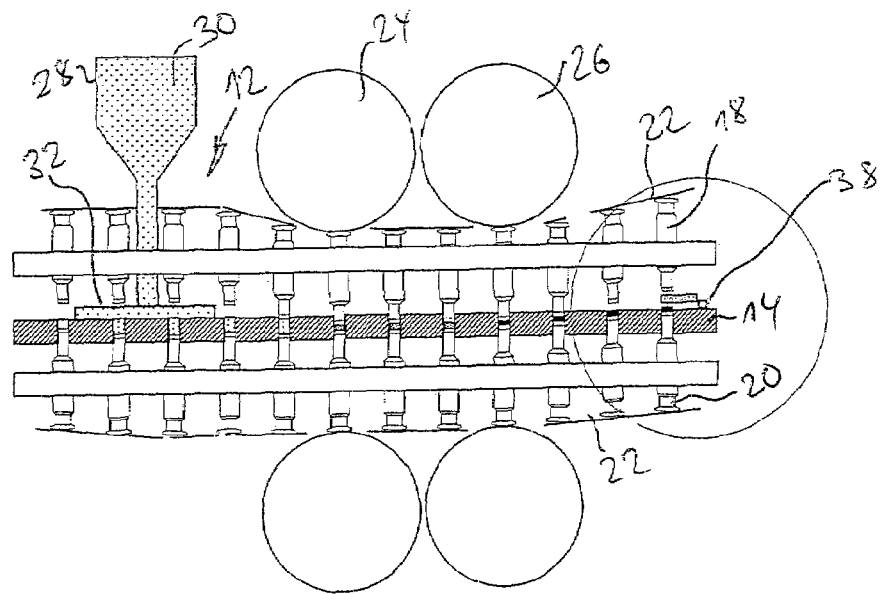
FIG. 1 shows a part of a rotary tablet press with a temperature sensor.

In FIG. 1, a part of a rotor 12 of a rotary press is indicated, which is rotatably driven around a vertical axis (not shown) and is situated inside a press room. The rotor 12 has a circular die plate 14 with discrete die bores 16, to each of which one pair of pressing stamps is assigned, namely an upper stamp 18 and a lower stamp 20. The pressing stamps 18, 20 co-operate with stationary cam elements 22, which in each case predetermine the position of the stamps in their rotation with the rotor 12. In FIG. 1, one pair of pre-pressure rollers 24 and one pair of main pressure rollers 26 is shown in a pressing or compression station. The pressure roller pairs 24, 26 conduct the pressing of the powder material inside the die bores 16 with the aid of the pressing stamps 18, 20 running there between. A hopper 28 serves for the supply of the powder material, which gives up powder material 30 into a feeder shoe 32. The latter fills the individual dies one after the other with a predetermined filling amount of powder, the filling amount being determined by the position of the lower stamps 20 in the die bores 16 in doing so. The stamps 18, 20 are lead in suitable stamp guide tracks 34, 36 of the rotor 12. The described parts are per se known.

Figure 2:
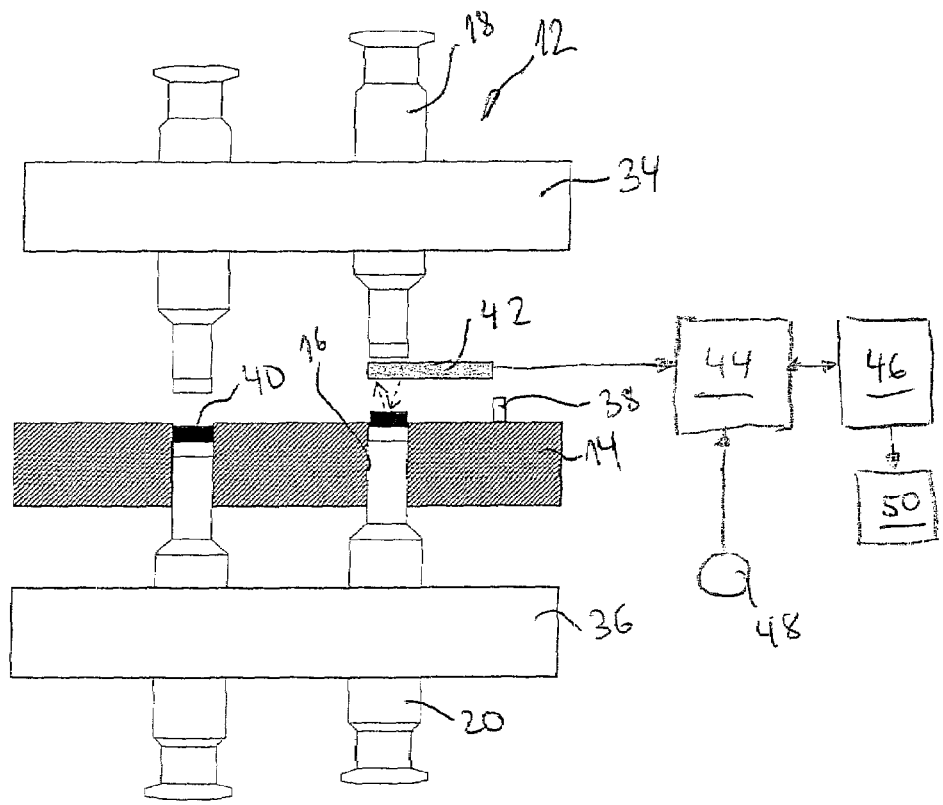
FIG. 2 shows a part of the device according to FIG. 1 in an enlarged view, with an additional block diagram.

As can be further seen from FIGS. 1 and 2, the finished pressed tablets are ejected with the aid of the lower stamps 20, the upper stamps already being lead back (see FIG. 2 in particular). A stripper element 38 provides then that the ejected tablets 40 are pushed away from the upside of the circular die plates 14 into the direction of a tablet delivery.

Above the partial circle of the die bores 16, a temperature sensor 42 is disposed. The arrangement location of the sensor 42 is such that the respective upper stamp 18 has already moved out of the die bore 16 sufficiently far so that there is space for the sensor 42. On the other hand, the tablet 40 pressed before is still somewhat inside the die bore and can be localised. The temperature sensor 42 has a measurement plane which faces the tablet 40. It is an infrared sensor, for instance, which is capable to carry out a temperature measurement in a very short time, i.e. within less than 0.01 seconds. To date, the production speed with high-performance presses is one hundred pressings per second, for instance. The temperature sensor 42 is connected to a machine computer 44. The machine computer, as is commonly known for tablet pressing, controls and regulates the operation of the press. It co-operates with an operating computer 46. An impulse generator 48 is assigned to the not shown shaft of the rotor 12, the signals of which are input to the machine computer 44. The impulse generator 48 is a known angle encoder, for instance, which gives up a corresponding signal to the machine computer 44 in very small angle steps, in order to establish the position of the individual die bores 16. Through this, the temperature acquirement position of the tablets with respect to the temperature sensor 42 can also be established. The signals of the temperature sensor 42 go to the machine computer 44 and are evaluated and forwarded to the operating computer 46 there. The evaluation procedure is position-dependent, i.e, the temperature measured by the temperature sensor 42 is assigned to one individual tablet. In doing so, a multiple measurement can also be carried out with the aid of the temperature sensor 42. It is also possible to carry out the measurement in interval distances, the interval distances being determined by the time which it takes a die bore at one pitch of the dies before the temperature acquirement position to reach the temperature acquirement position.

The established data from the machine computer can be filed and stored in the operating computer 46 or also be displayed in a display device 50.

The temperature of the tablets measured with the temperature sensor 42 is not that one which occurs during the pressing process. Immediately after pressing, the temperature is maximum and then it gradually decays when the tablet is moved on with the circular die plate and subsequently ejected. If the maximum temperature is to be established, the cooling behaviour of the tablet material is decisive, as well as the time which passes from the pressing station to the temperature acquirement position, when the cooling effect of the die is neglected. Of course, the latter can also be taken into consideration in the calculation. With the aid of these data, the maximum temperature can be extrapolated. When the latter is too high, measures must be taken in order to prevent thermolabile tablet material from overheating.

With the aid of the shown device, it is also possible to measure the heat quantity taken up and thus to extrapolate the energy quantity taken up. The heat quantity is depending of the specific heat capacity of a substance, its mass and the temperature measured. In this way, the energy can be established in the machine computer 44. It can be used to optimize the production process for the tablets.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto

What is claimed is:

1. A device for monitoring the production of tablets, comprising:
    a rotary press, with die bores in a circular die plate for the accommodation of a powder to be pressed;
    upper-and lower stamps;
    a pressing station for pressing the powder in the die bores by means of the upper and lower stamps;
    a tablet stripper for stripping off the tablets ejected by the lower stamps from the upper side of the circular die plate;
    a machine computer;
    a contactless working temperature measurement device, which is in communication with the machine computer (44), having a measurement plane, the contactless working temperature measurement device being arranged between the pressing station (24, 26) and the tablet stripper (38), and the measurement time of the temperature measurement device is such that the temperature can be measured of at least two or more of the tablets per rotation of the circular die plate;
    further including a position transmitter (48), which is in communication with the machine computer (44), and which triggers via the machine computer (44) either a measurement procedure, which is triggered by the position of the dies (16) with respect to the measurement plane of the contactless working temperature measurement device, detected by the position transmitter (48), or an evaluation of a measurement signal in the machine computer (44).

2. The device according to claim 1, characterised in that a contactless temperature measurement device is provided, an infrared measurement device for instance.

3. The device according to claim 1, characterised in that the temperature measurement device is in communication with the machine computer (44) via a line or in a wireless manner for the purpose of logging, monitoring, sorting and so forth.

4. A method for monitoring the production of tablets, comprising the steps of:
    providing a rotary press, which has a rotor with upper and lower stamps, a circular die plate, cam system for the stamps, at least one pressing station and a filling system for the powder-shaped pressing material;
    measuring the temperature of two or more tablets per rotation of the circular die plate using a contactless working temperature sensor having a short temperature acquirement time, the temperature of the tablets is measured in a press room, after the upper stamps have left the die;
    determining a temperature measurement position using position signals created with a position transmitter, the temperature data are mathematically related to the temperature measurement point, and the maximum temperature of the tablet is established by means of a cooling characteristics of the tablets, the point in time of temperature measurement and the point in time of the pressing.

5. The method according to claim 4, characterised in that at least two temperature measurements per tablet are carried out.

6. The method according to claim 4, characterised in that the energy quantity taken up by the tablets is established with the aid of the mass of the pressed articles and a time-temperature diagram for the material of the tablets.

* * * * *